US005475376A

United States Patent [19]

Chikamitue et al.

[11] Patent Number: 5,475,376

[45] Date of Patent: Dec. 12, 1995

[54] SAFETY-DEPOSIT BOX SYSTEM

[75] Inventors: Masaru Chikamitue; Kengo Ishibashi, both of Osaka; Hiroshi Ito; Kentaro Adachi, both of Fukushima, all of Japan

[73] Assignee: Itoki Co., Ltd., Osaka, Japan

[21] Appl. No.: 394,220

[22] Filed: Feb. 24, 1995

Related U.S. Application Data

[63] Continuation of Ser. No. 22,275, Feb. 25, 1993, abandoned.

[30] Foreign Application Priority Data

Jul. 31, 1991 [JP] Japan .................................. 4-224991
Feb. 25, 1992 [JP] Japan .................................. 4-073554

[51] Int. Cl.[6] .................................. G06K 9/62

[52] U.S. Cl. .................................. 540/825.31

[58] Field of Search .................. 340/825.31, 825.34, 340/571; 382/2, 4; 70/277, 278, 409; 395/600, 650

[56] References Cited

U.S. PATENT DOCUMENTS

| | | | |
|---|---|---|---|
| 4,382,255 | 5/1983 | Pretini | 109/3 |
| 4,461,221 | 7/1984 | Schandle et al. | 109/3 |
| 4,779,090 | 10/1988 | Migznik et al. | 70/278 |
| 4,998,952 | 3/1991 | Hyatt, Jr. et al. | 70/395 |
| 5,132,661 | 7/1992 | Pinnow | 340/825.31 |
| 5,164,992 | 11/1992 | Turk et al. | 382/2 |
| 5,245,329 | 9/1993 | Gokcebay | 340/825.31 |
| 5,283,644 | 2/1994 | Maeno | 382/2 |

*Primary Examiner*—Thomas G. Black
*Assistant Examiner*—Peter Y. Wang
*Attorney, Agent, or Firm*—Sughrue, Mion, Zinn, Macpeak & Seas

[57] ABSTRACT

In a safety-deposit box system including a safety-deposit box, a system controller, and a safety-deposit box controller, a multi-function key is used. The safety-deposit box has a lock and the multi-function key has a metal portion and an electronic memory. Information electronically stored on the electronic memory is read by a reception device and sent to a determination device in the system controller. The determination device compares the sent information with information prerecorded in an electronic memory in the system controller. When the two sets of information agree, the system controller outputs a signal to the safety-deposit box controller. After receiving the signal, the safety-deposit box controller checks mechanical appropriateness of the metal key portion and, if mechanically appropriate, unlocks the lock.

24 Claims, 16 Drawing Sheets

SAFETY-DEPOSIT BOX SYSTEM

This is a continuation of application No. 08/022,275, filed Feb. 25, 1993, now abandoned.

BACKGROUND OF THE INVENTION

1. Field of the Invention

The present invention relates to a safety-deposit box r system, and more particularly to the safety-deposit box system using a multi-function key.

2. Description of the Related Art

Banks, credit unions, and securities companies among other organizations (hereinafter, referred to generally as banks) lease safety-deposit boxes to customers for storing valuable items such as documents, seals, and precious metals and stones. Banks must be able to guarantee that the safety-deposit boxes are completely secure against unauthorized entry, but simple and easy to access by actual customers.

There has been known a conventional safety-deposit box system which includes a walk-in vault installed within a bank building. A vault door, hereinafter referred to as the first door, is formed into a wall of the walk-in vault for allowing entry therein. The walk-in vault is divided into two chambers: an anteroom and a safety-deposit box chamber. The anteroom is directly inside the first door upon entering the walk-in vault and is separated from the safety-deposit box chamber by walls and a second door.

Safety-deposit boxes are installed in rows and columns to the walls of the safety-deposit box chamber. Each safety-deposit box is provided with a bank-side lock and a user-side lock, each with a different key. Both locks must be opened to access the contents of the safety-deposit box. The key for user-side lock is kept by the customer and the key for the bank-side lock is kept by the bank.

To open his/her safety-deposit box, a customer must first fill out, sign or similarly execute a form, and submit it to a bank employee. After confirming the identity of the customer by verifying authenticity of the customer's signature, the bank employees escorts the customer through the first door, the antechamber, and the second door and into the safety-deposit box chamber. To open the safety-deposit box, the customer and the bank employee must insert the two keys into respective locks of the safety-deposit box and simultaneously turn the keys to open the locks. To close the safety-deposit box, the customer and the bank employee must again insert the keys into the respective locks and again turn them simultaneously. The bank employee then escorts the customer out of the walk-in vault through the second and first door.

However there has been known a problem with the above conventional safety-deposit box system in that because the first and second doors conceal the safety-deposit box chamber from the vision of bank employees, surveillance is obstructed.

There has been known another problem in that a bank employee must accompany each customer to the safety-deposit box chamber.

A further problem is seen in that the bank verifies the identity of customers and allows him/her to enter the safety-deposit box chamber depending only on a form handwritten by the customer. Records on the comings and goings of customers are also based only on these forms.

A still further problem is that every time a customer wants to open his/her safety-deposit box, he/she must bring his/her key and follow the above time-consuming procedures for opening the safety-deposit box.

To solve the above problems there has been described and put into practice an automated safety-deposit box system which, as does the non-automated type, includes a walk-in vault installed within the bank building, a first door for allowing entry into the walk-in vault, an anteroom and a safety-deposit box chamber, the anteroom being directly inside the first door upon entering the walk-in vault and being separated from the safety-deposit box chamber by walls and a second door.

The automated safety-deposit box system further includes a first card reader, a second card reader, an imprinter installed in the second card reader, and a central control unit. The first card reader is installed outside the walk-in vault near the first door. Inserting an appropriate card into the first card reader unlocks the first door. The second card reader is installed outside the safety-deposit box chamber near the second door. Inserting an appropriate card and inputting an appropriate code number into the second card reader unlocks the second door. The imprinter takes a copy of appropriate cards inserted into the second card reader.

The central control unit is installed, for example, in an office of the bank and is electrically connected to the first card reader, the second card reader, the first door, and the bank-side lock provided to each safety-deposit box. The central control unit includes a central processing unit (CPU), a cathode ray tube (CRT) display, a keyboard, a memory device, and a printer.

According to conventional automated safety-deposit box systems, upon entering a contract to lease a safety-deposit box, in addition to a key to the safety-deposit box, a customer is issued a card containing a magnetic strip onto which is recorded, among other information, a code number designated by and known only to the customer.

After entering the bank, a customer approaches the first door and inserts his/her card into the first card reader, thereby opening the first door. After passing through the first door, the customer enters the anteroom and approaches the second door. The customer inserts his/her card into the second card reader and then inputs his/her code number. The inputted code number is transmitted to the central control unit which checks it with a code number for the customer stored in the memory. Because only the customer knows his/her code number, if the code numbers match, the identity of the customer is confirmed. When the customer's identity is confirmed, the central control unit sends a signal to the imprinter, which then takes a copy of embossment on the card, to the second door, which then opens, and to the bank-side lock of the customer's safety-deposit box electronically connected to the CPU, which then opens. The customer enters the safety-deposit box chamber and opens the user-side lock of his/her safety-deposit box with his/her key. The central control unit records such information as the frequency and time of visits by each customer, customer names, and the duration of time the safety-deposit boxes are open. After the customer is finished using his/her safety-deposit box, he/she locks the safety-deposit box and leaves the walk-in vault through the second and first door.

Conventional automated safety-deposit box systems solve many of the problems of non-automated safety-deposit box systems. For example, safety is insured because only people with a card can enter into the safety-deposit box chamber. Also labor requirements of the bank are reduced because bank employees do not need to escort customers and because records of comings and goings of customers are performed by computer. The computer maintaining records of customer's comings and goings is also more efficient than relying on handwritten forms. A customer can gain entrance to his/her safety-deposit box with relative ease merely by bringing his/her key and card to the bank.

However, there has been known a problem with automated safety-deposit box systems in that the keys and cards used therein can be copied and forged. Therefore even if the bank collects keys and cards from a customer after termination of the lease contract for a safety-deposit box, such copied keys and forged cards can be used to gain entry to the safety-deposit box chamber and the contents of the safety-deposit boxes therein. To prevent this from happening, the bank must change the lock cylinder of the safety-deposit box when a customer terminates his/her lease contract. This raises maintenance costs.

The cards used in automated safety-deposit box systems also create problems. Each card must be specially made and can require as long as a week for delivery. Consequently the customer must wait up to a week before being able to use his/her safety-deposit box. Also the material used to make these cards has low mechanical strength so the cards can be easily bent and damaged. The embossing on the cards prohibits the cards from being reused by ensuing customers.

Further problems arise from the magnetic strips of the cards used in this system. That is, the information recorded on the magnetic strips are affected or destroyed by external magnetic sources. Also, the memory capacity of magnetic strips is compared to a ROM or similar electrical memory unit and prohibits expanding functions of the card beyond identifying the customer.

Also in addition to having to bring the safety-deposit key with him/her as with non-automated systems, customers must also bring the card. Also some steps of procedures for opening the safety-deposit box require the key although others require the card which makes procedures unnecessarily confusing.

SUMMARY OF THE INVENTION

The present invention has been made to solve the above-noted problems, and accordingly it is an object of the invention to provide a safety-deposit box system which allows a customer to gain entry to his/her safety-deposit box chamber with simple procedures.

Another object of the invention is to provide a safety-deposit box system which assures high degree of safety against illegal use thereof.

Still another object of the invention is to provide a safety-deposit box system which can be used with lower maintenance costs.

Yet another object of the invention is to provide a safety-deposit box system which uses a mechanically strong and magnetic-proof versatile or multi-function key for use in identifying a customer and locking/unlocking a customer-side lock of a safety-deposit box chamber.

To achieve the above and other objects of the invention, there is provided a safety-deposit box system in which a multi-function key is used. The multi-function key includes a first electronic memory portion and a metal key portion. The first electronic memory portion has recorded therein a first set of safety-deposit box user information. A plurality of safety-deposit boxes each including a door with a user-side lock are provided. A reception device is provided which includes a reading means for reading the first set of safety-deposit box user information. There is further provided a system controller including a second electronic memory and a determination means. The second electronic memory contains a second set of safety-deposit box user information which the determination means compares with the first set of safety-deposit box user information. The system controller outputs a permission-to-use signal when the first set of safety-deposit box user information agrees with the second set of safety-deposit box user information. There is further provided a safety-deposit box controller including a mechanical appropriateness determination means for determining mechanical appropriateness of the metal key portion. The safety-deposit box controller receives the permission-to-use signal and opens the user-side lock if the mechanical appropriateness determination means determines that the metal key portion is mechanically appropriate.

The multi-function key has a surface to which an identification code is provided for identifying an authorized user, and image pickup/recording means is provided for picking up and recording an image of the identification code. The image pickup/recording means further picks up and records a face of a user who uses said multi-function key.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Referring to the accompanying drawings, a first preferred embodiment of the invention will be described.

Figure 1:
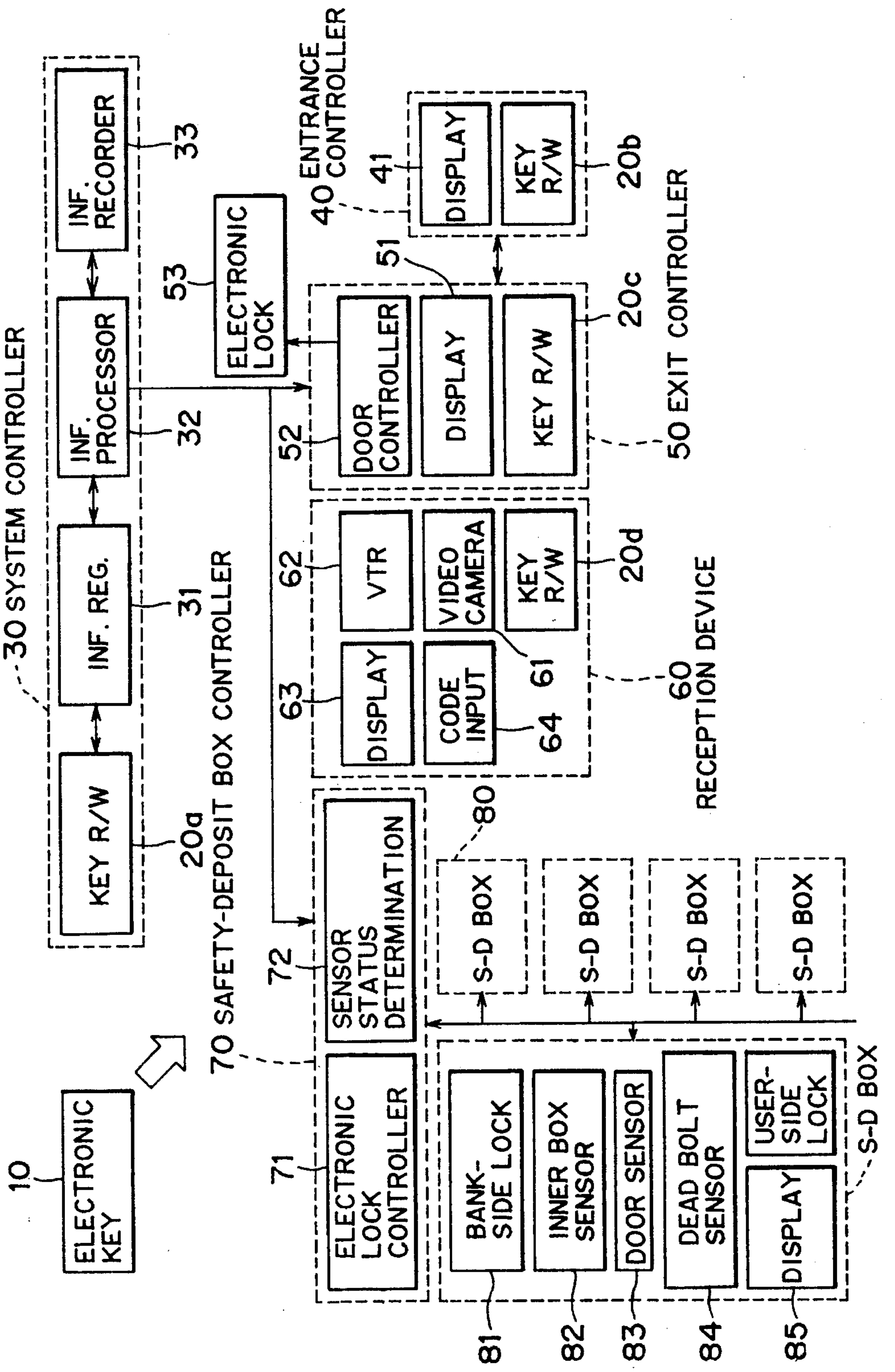
FIG. 1 is a block diagram showing the arrangement of a safety-deposit box system according to a first preferred embodiment of the present invention.

FIG. 1 is a block diagram showing a safety-deposit box system according to a first preferred embodiment of the present invention. In the example used in the first preferred embodiment, the safety-deposit box system is installed in a bank. However, the system can be installed anywhere safety-deposit boxes are provided.

Figure 2:
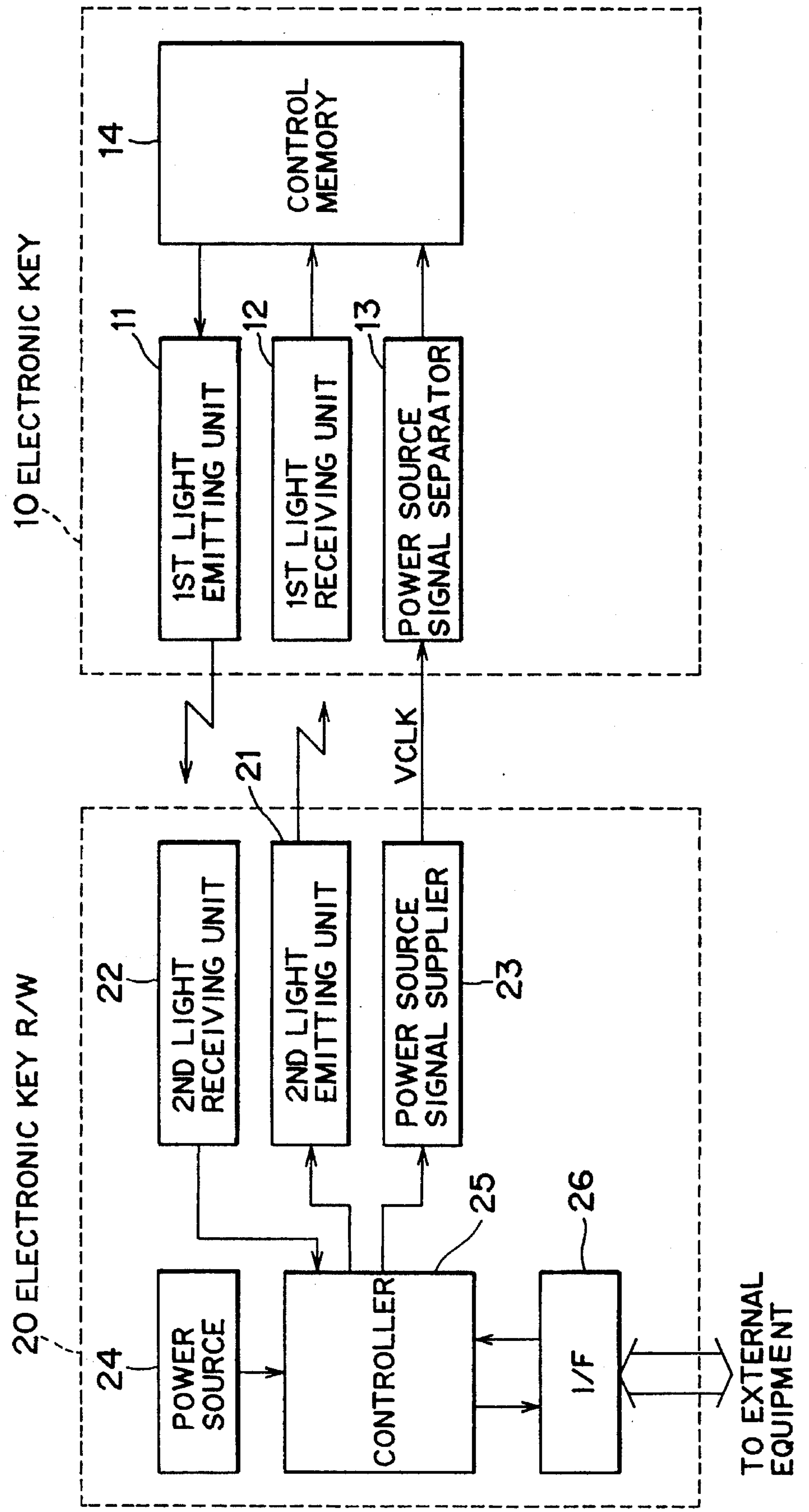
FIG. 2 is a block diagram showing the interrelation of components in an electronic key and an electronic key reader/writer of the first preferred embodiment.

The bank issues an electronic key 10, which is used to operate the system, to customers who enter a contract for leasing a safety-deposit box. As will be described in detail later, the electronic key 10 includes a circuit board 16 integrated with a metal key portion 17. Although integrated in the first preferred embodiment, the metal key portion 17 and the circuit board 16 can be separate and detachable. As will be described in more detail later, the circuit board 16 of the electronic key 10 includes a control memory 14 as shown in FIG. 2. The control memory includes a microcomputer and an EEPROM into which is stored management information including the type of key, bank number, branch number, safety-deposit box number, issuing records, dates and times the safety-deposit box was opened, and the customer's name, sex, address, and identification number which was recorded therein in advance by the bank. Engraved or stamped on the electronic key 10 is an identification number or symbol.

The safety-deposit box system according to the first preferred embodiment includes a walk-in vault installed within the bank, a first door for regulating entry into the walk-in vault, an anteroom, a safety-deposit box chamber, a system controller 30, an entrance controller 40, an exit controller 50, a reception device 60, and a safety-deposit box controller 70. The anteroom is directly inside the first door upon entering the walk-in vault and the safety-deposit box chamber is beyond the anteroom.

The system controller 30 is installed, for example, in an office of the bank. The entrance controller 40 is installed outside the walk-in vault near the first door. The exit controller 50 is installed inside the walk-in vault near the first door. The reception device 60 is installed in the anteroom.

The system controller 30 controls the entire system. The system controller 30 includes a first electronic key reader/writer (R/W) 20*a*, an information registration device 31, an information processor 32, and an information recorder 33. The management information stored in the control memory 14 of the electronic key 10 has been recorded therein by using the first electronic key reader/writer 20*a*. Management information is also recorded into the information registration device 31, and, after processing, into the information recorder 33. The information processor 32 is electrically connected to the entrance controller 40, the exit controller 50, the reception device 60, and the safety-deposit box controller 70. These devices mutually send and receive management information.

The exit controller 50 includes a door controller 52, a second display 51, and a third electronic key reader/writer 20*c*. Exit by customers from the walk-in vault is regulated from inside the walk-in vault by the exit controller 50. The door controller 52 is electronically connected to a first electronic lock 53 provided to the first door. The second display 51 displays commands for customers to follow for exiting the walk-in vault, and the third electronic key reader/writer 20*c* reads management information recorded in the electronic key 10 required to exit the walk-in vault.

The entrance controller 40 includes a first display 41 and a second electronic key reader/writer 20*b*. Entrance by customers into the walk-in vault is regulated from outside the walk-in vault by the entrance controller 40. The entrance controller 40 is electrically connected to the first electronic lock 53 via the door controller 52. The first display 41 displays commands for customers to follow for entering the walk-in vault. The second electronic key reader/writer 20*b* reads management information recorded in the electronic key 10 required to enter the walk-in vault.

Both the second electronic key reader/writer 20*b* and third electronic key reader/writer 20*c* have the same construction as the first electronic key reader/writer 20*a*.

The reception device 60 includes a fourth electronic key reader/writer 20*d*, a video camera 61, a video tape recorder (VTR) 62, a third display 63, and a code input portion 64. The fourth electronic key reader/writer 20*d* reads management information from the electronic key 10. Code data is input at the code input portion 64. The read management information and the inputted code data are sent to the system controller 30. The fourth electronic key reader/writer 20*d* is constructed the same as the first through third electronic key reader/writers 20*a* through 20*c*. The video camera 61 picks-up an image of the identification number on the electronic key 10 which is recorded in composite with such information as the time, date, and the corresponding safety-deposit box number into the video tape recorder 62.

The safety-deposit box controller 70 includes an electronic lock controller 71 and a sensor status determination unit 72.

A plurality of safety-deposit boxes 80 are provided in columns and rows to the walls of the safety-deposit box chamber. Each safety-deposit box includes an inner box receptacle built into a wall of the safety-deposit chamber, an independent inner box insertable into and removable from the inner box receptacle, a safety-deposit box door for securely enclosing the inner box in the inner box receptacle an inner box sensor 82, a door sensor 83, a dead bolt sensor 84, and a third display 85. A user-side lock 86 and a bank-side lock 81 provided to the safety-deposit box door. Each sensor is connected to the sensor status determination unit 72. The bank-side lock 81 and the user-side lock 86 of each safety-deposit box 80 in the safety-deposit box chamber are electrically connected to the safety-deposit box controller 70.

FIG. 2 is a block diagram showing construction of the electronic key 10 and an electronic key reader/writer 20. The electronic key 10 includes a first light emitting unit 11, a first light receiving unit 12, a power source signal separator 13, and the control memory 14. The power source signal separator 13 supplies voltage from the electronic key reader/writer 20 to each component in the electronic key 10 via the control memory 14, and also separates signals superposed on the power source voltage and outputs them to the control memory 14. The first light receiving unit 12 receives light signals from the electronic key reader/writer 20 and sends them to the control memory 14. The first light emitting unit 11 sends light signals to the electronic reader/writer 20 based on commands from the control memory 14. The control memory 14 starts operating upon receiving power from the power source signal separator 13 thereafter controlling output from the first light emitting unit 11, reading signals inputted from the power signal separator 13, and storing control information and code information from the first light receiving unit 12 into the EEPROM. Management information including the last day the safety-deposit box was used, duration of time the safety-deposit box was used, safety-deposit box number, and status of the safety-deposit box can be recorded into the EEPROM in an erasable condition. Because use restrictions and prohibitions can also be written into the EEPROM, this provides high security and reliability. Moreover, because the electronic key 10 can not only store management information but also, in cooperation with the electronic key reader/writer 20, perform various functions, it can be called multi-function.

The electronic key reader/writer 20 includes a second light emitting unit 21, a second light receiving unit 22, a power source signal supplier 23, a power source 24, and a controller 25. The power source 24 supplies power to the controller 25 which in turn supplies it to the various components of the electronic key reader/writer 20. The controller 25 superposes control signals onto voltage it supplies to the power source signal supplier 23 which in turn supplies the resultant signal (VCLK) to the power source signal separator 13 in the electronic key 10. The second light emitting unit 21 sends an infrared light signal based on commands from the controller 25 to the first light receiving unit 12 of the electronic key 10. The second light receiving unit 22 receives the infrared light signal from the first light emitting unit 11 of the electronic key 10 and outputs it to the controller 25. The interface 26 is an input/output circuit for connecting external equipment with the controller 25.

Figure 3A:
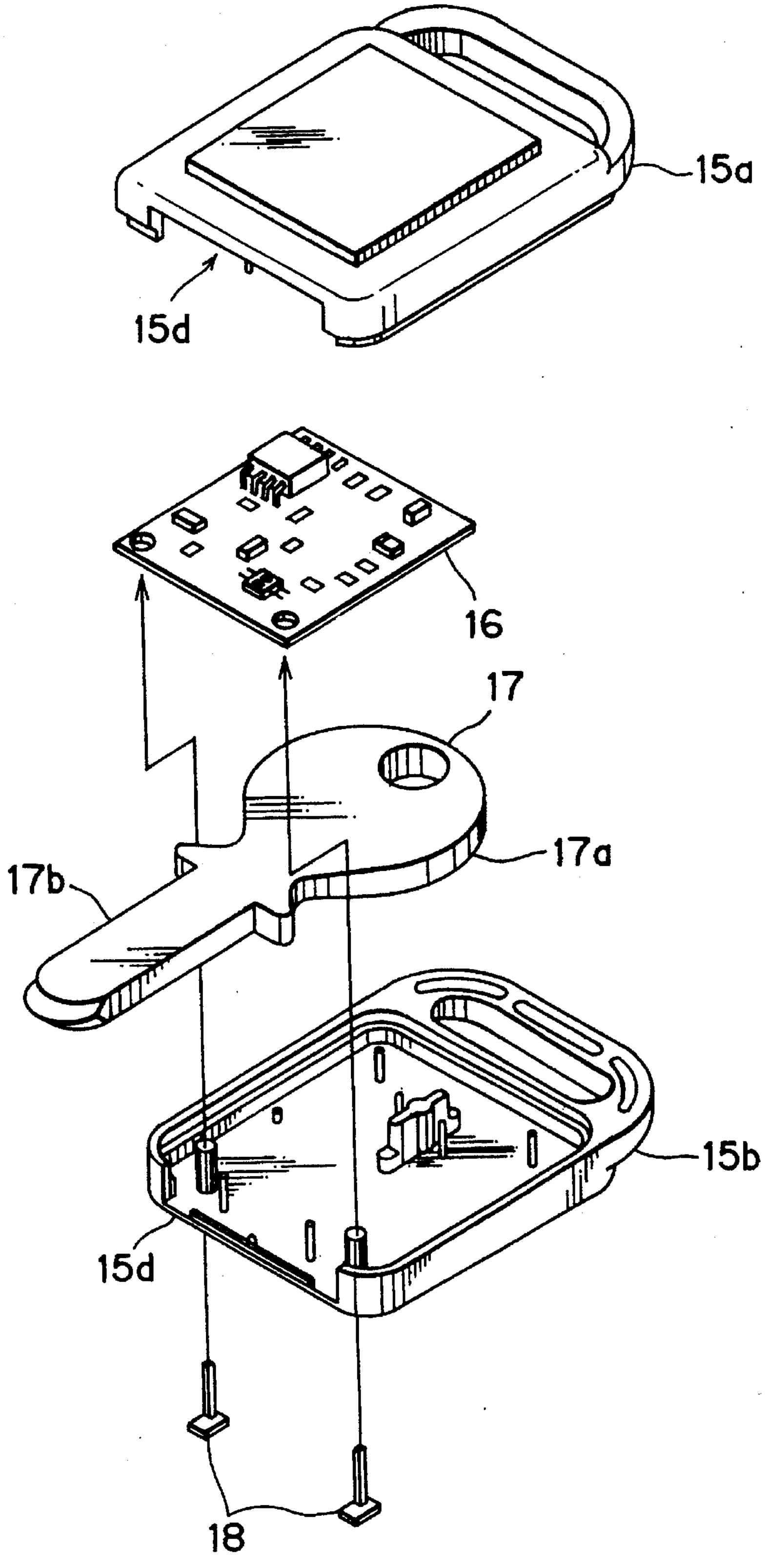
FIG. 3A is an assembly diagram showing the electronic key wherein a metal key portion and an electronic portion are integrated.
Figure 3B:
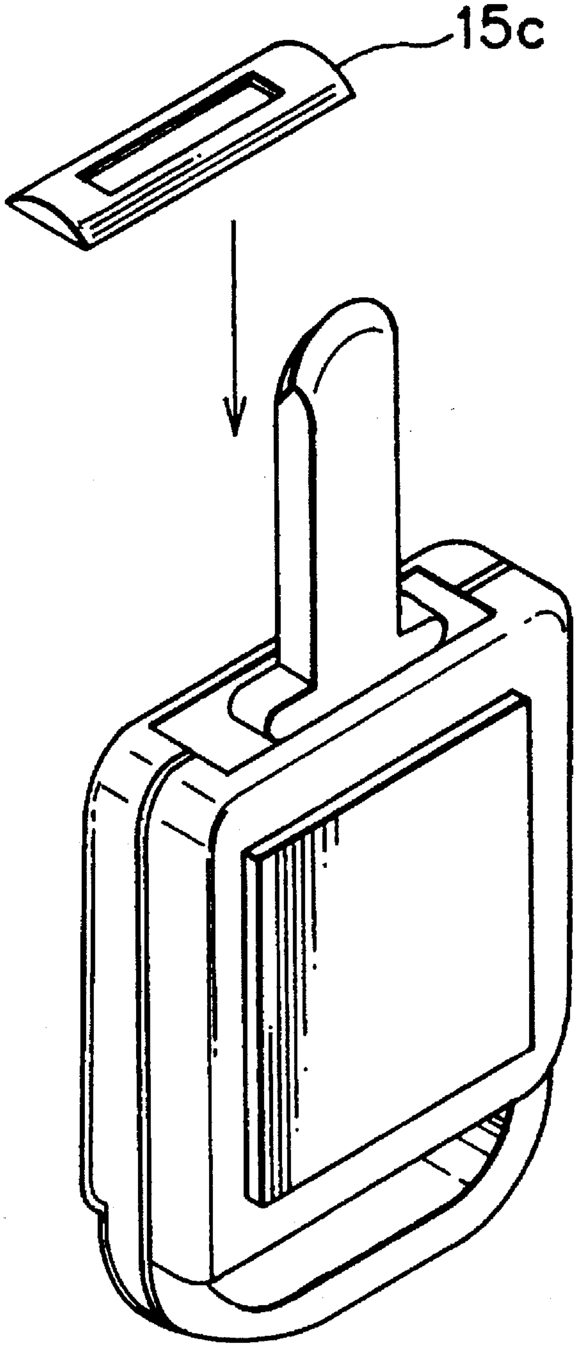
FIG. 3B is a perspective diagram showing the electronic key in FIG. 3A partially assembled.

As shown in FIG. 3A, the electronic key 10 used in the safety-deposit box system according to the present invention includes a circuit board 16 integrated with a metal key portion 17. On the circuit board 16 are mounted the electronic components of the electronic key 10 described while referring to FIG. 2. The metal key portion 17 includes a grip **17*a* and a jack portion 17*b*. As shown in FIG. 3A a lower case member 15*b*, into which are formed through-holes, and an upper case member 15a form a receiving case for housing the circuit board 16 and the grip 17*a*. Pins 18, made from electrodes, pass through the through-holes in the lower case member 15*b* and are soldered to the circuit board 16. The grip 17*a* is provided to the lower case member 15*b* electrically isolated from the circuit board 16. An opening 15*d* is formed at a side of the receiving case from which extends the jack portion 17*b*. The positioning of the circuit board 16 and the metal key portion 17 within the receiving case is fixed when the upper and lower case members 15*a* and 15*b* are affixed together using an adhesive, such as epoxy, that is transparent to infrared light. Afterward, as shown in FIG. 3B, a lid section 15*c* is affixed to the opening 15*d* to similarly fix the position of the jack portion 17*b*. The upper case member 15*a*, the lower case member 15*b*, and the lid section 15*c*** are made from a resin material that is selectively transparent to infrared light. After assemblage, the internal components are not visible to the naked eye.

The metal key portion 17 and the circuit board 16 that form the electronic key 10 can be made mutually detachable. The metal key portion 17 and the circuit board 16 can also be made into independent units. The following text will explain the structures and assemblage of such detachable electronic keys while referring to FIGS. 4A through 4F.

Figure 4A:
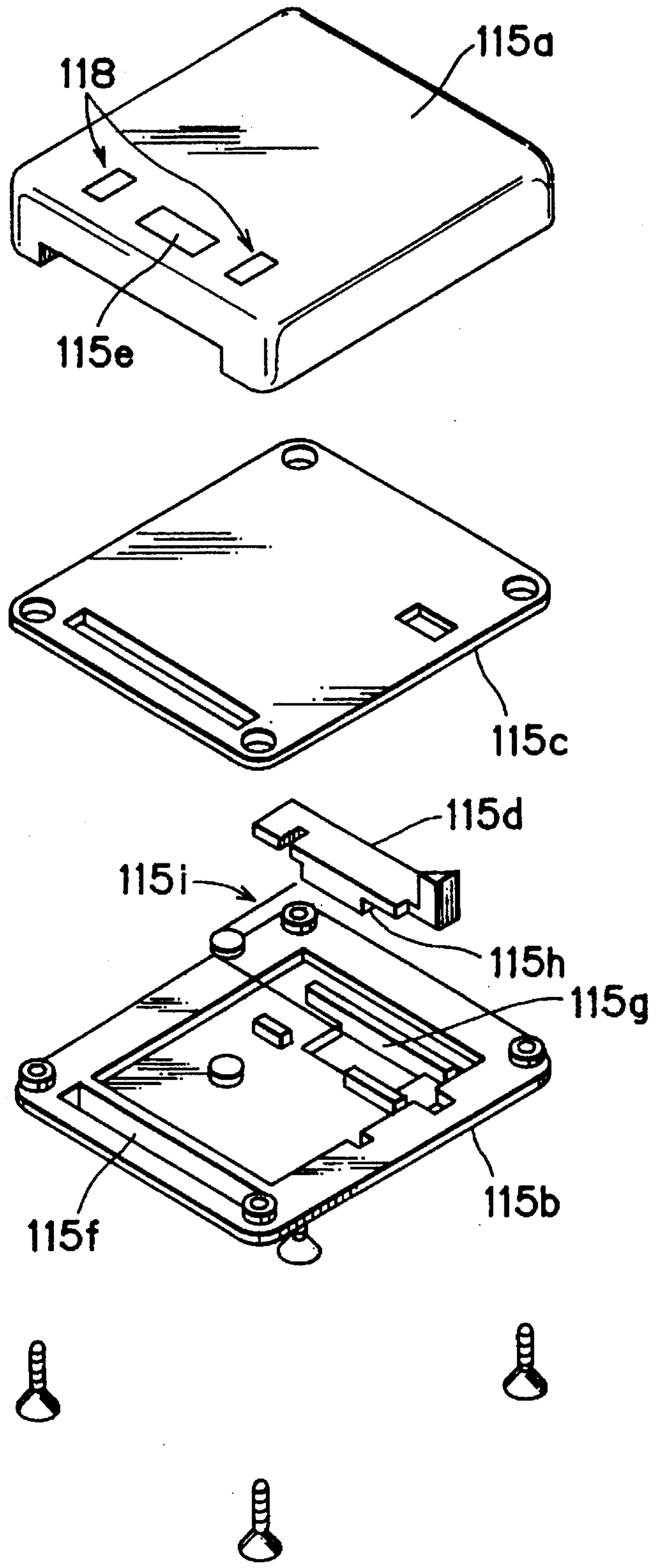
FIG. 4A is an assembly diagram showing the electronic portion separable from the metal portion.

Electrodes 118 and a light receiving unit **115*e* are formed to an upper surface of an upper case member 115*a* as in FIG. 4A. The electrodes 118 are electrically connected to a circuit board (not shown) in the upper case member 115*a*. The interior of the electronic key 10 is not visible through the light receiving unit 115*e*. The electronic board is installed to the interior of the upper case. The light receiving unit 115*e* is located where the first light emitting unit 11 and the first light receiving unit 12 send and receive light signals to and from the electronic key reader/writer 20. A key number window 115*f* is formed in the lower case member 115*b*** so the key number engraved in the grip can be seen externally.

A slide hole **115*g* is formed in the lower case member 115*b*. A slide latch 115*d* formed with a protruding manipulator 115*h* is slidably mounted to slide hole 115*g* with the manipulator 115*h* protruding through the slide hole 115*g*. The slide latch 115*d* is slidably held in place in the slide hole 115*g* by a latch pressing board 115*c*. A spring 115*i* urges the slidably mounted slide latch 115*d* into a lock position. Manually sliding the manipulator 115*h* in the direction opposite to the urging direction of the spring 115*i* moves the slide latch 115*d*** from the lock position to a release position.

Figure 4B:
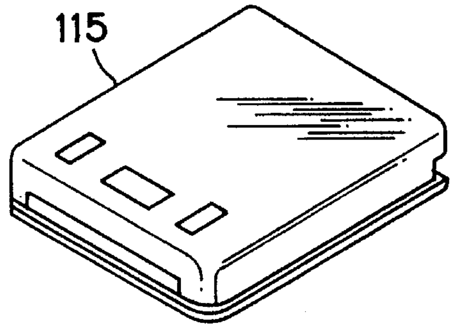
FIG. 4B is a perspective diagram showing the electronic portion in FIG. 4A assembled.

To assemble the electronic key portion, shown disassembled in FIG. 4A, the upper casing portion **115*b* is attached by screws to the lower case portion 115*a* while incorporating the latch pressing board 115*c* and the slide latch 115*d***. When assembled the electronic key portion, appears as shown in FIG. 4B.

Figure 4C:
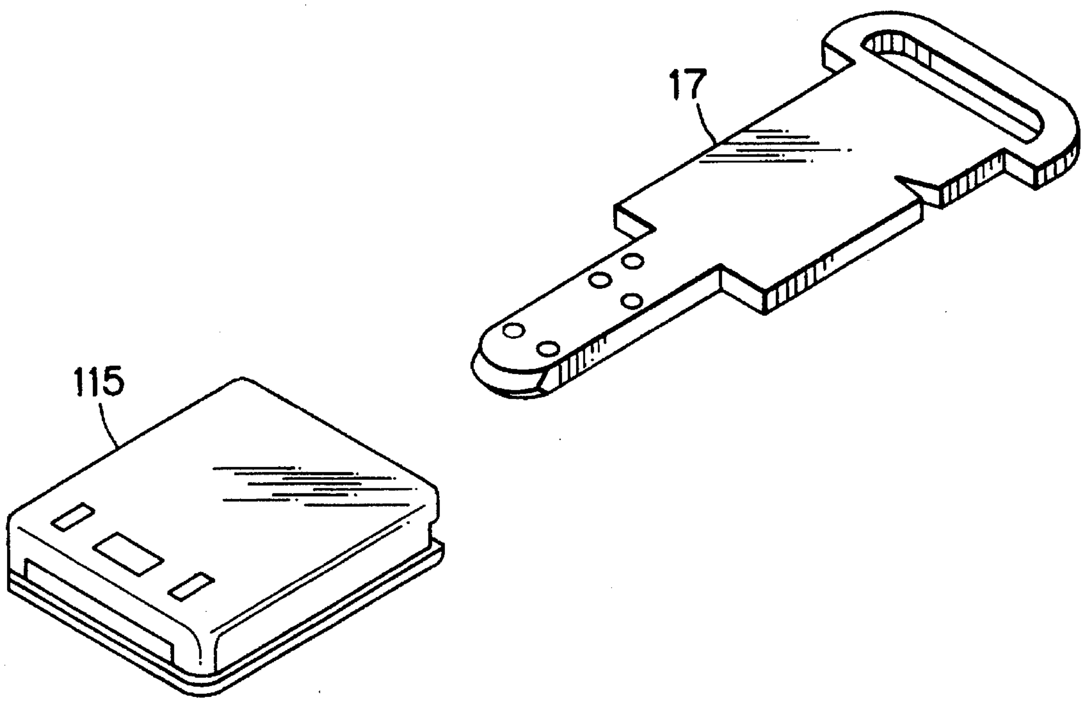
FIG. 4C is a perspective diagram showing the relative positions the electronic portion in FIG. 4A and the corresponding metal portion for inserting the metal portion into the electronic portion.
Figure 4D:
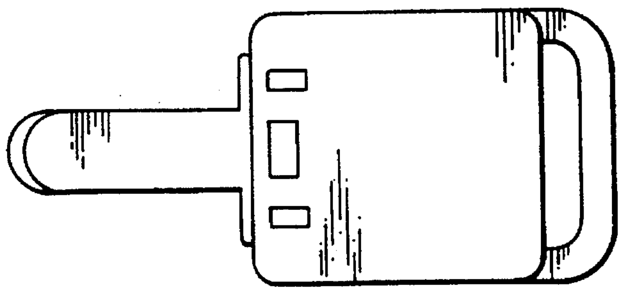
FIG. 4D is a front view showing the electronic key formed by the metal portion and the electronic portion of FIG. 4C.
Figure 4E:
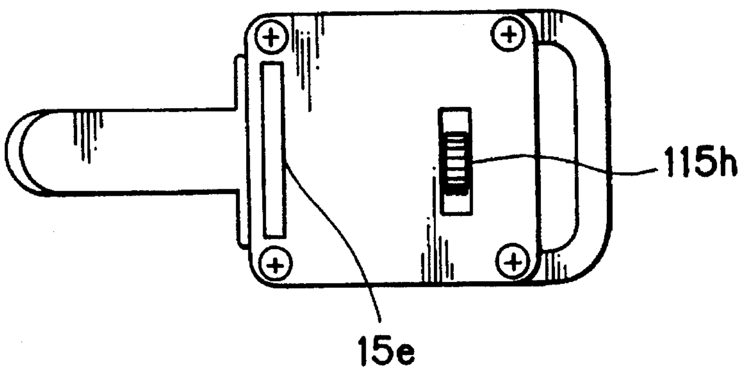
FIG. 4E is a rear view showing the electronic key in FIG. 4D.
Figure 4F:
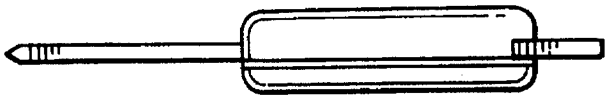
FIG. 4F is a side view showing the electronic key in FIG. 4D.

The metal key portion 17 is inserted into the electronic key portion 115, as shown in FIG. 4C, while the slide latch **115*d* is in the release position. After inserting the metal key portion 17, releasing the manipulator 115*h* allows the slide latch 115*d* to slide into the lock position by urging of the spring 115*i*. The slide latch 115*d* then holds the metal key portion 17 in place within the electronic key portion 115. Once the electronic key portion 115 is integrated with the metal key 17 by the method shown in FIG. 4C, the electronic key will appear as shown in a front view in FIG. 4D, a rear view in FIG. 4E, and a side view in FIG. 4F. To remove the metal key portion 17, the slide latch 115*d* is moved to the release position and the metal key portion 17** is pulled out of the casing.

Figure 5A:
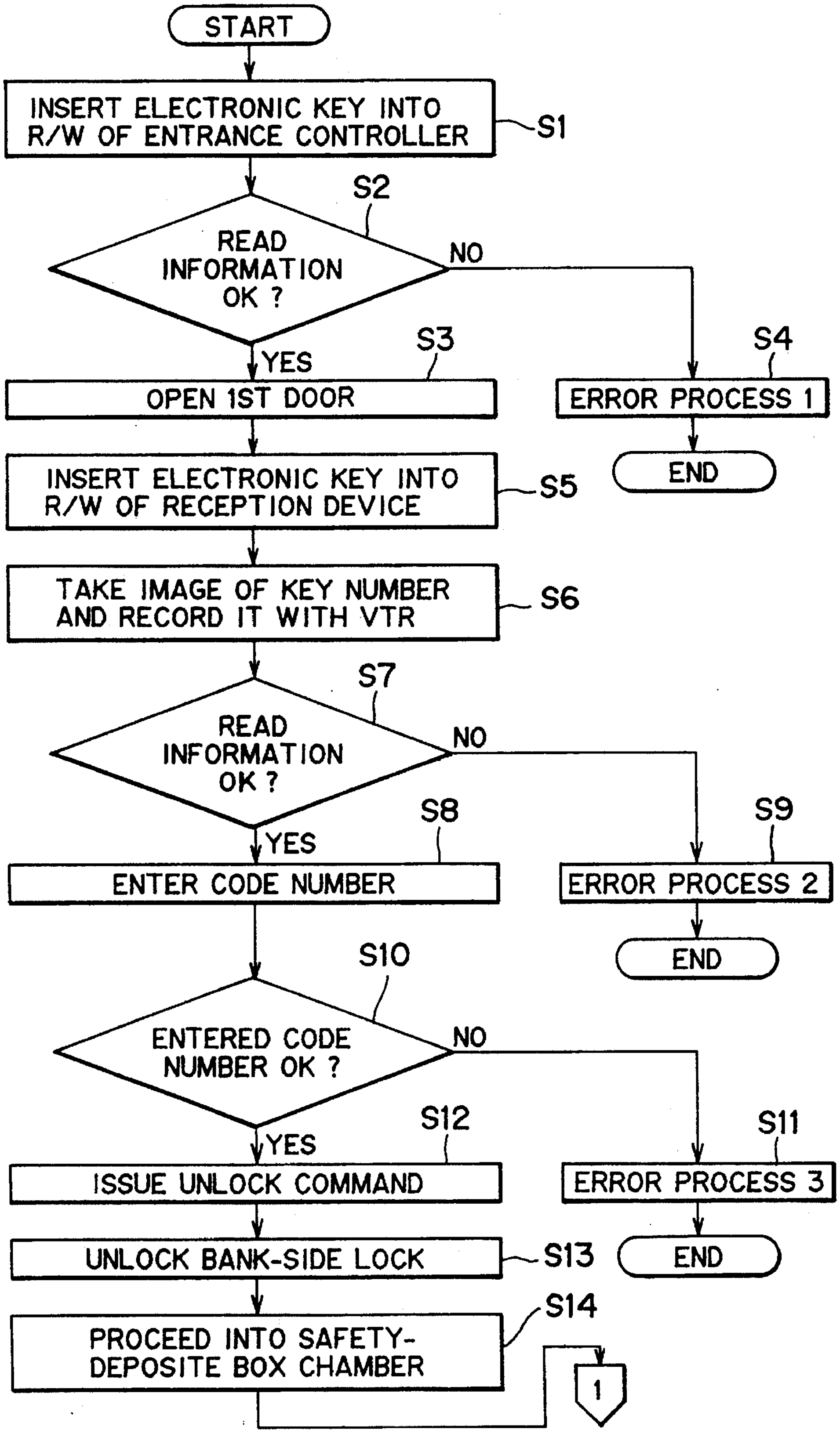
FIG. 5A is a flowchart showing reception operations of the safety-deposit box system.
Figure 5B:
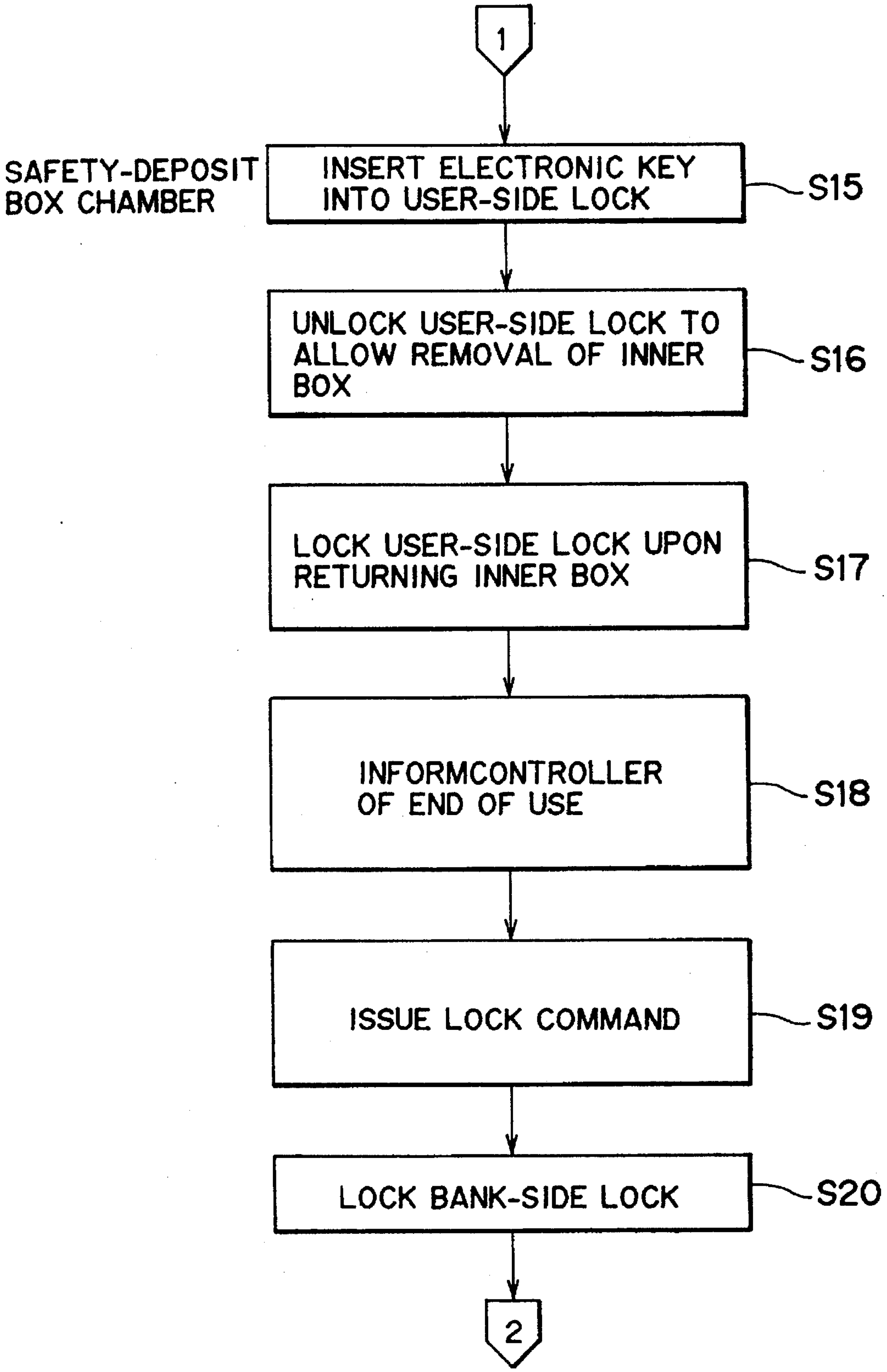
FIG. 5B is a flowchart showing safety-deposit box chamber operations of the safety-deposit box system.

Next, operation of the safety-deposit box according to the first preferred embodiment of the present invention will be made while referring to flow charts shown in FIGS. 5A through 5C.

A user of a safety-deposit box approaches the entrance controller 40 installed at the side of the first door and inserts his/her issued electronic key 10 into the electronic key reader/writer **20*b* in step S1. The display 41 displays instructions on data the user must input. The electronic key reader/writer 20*b* sends inputted information to the information processor 32 of the system controller 30. The information processor 32 compares the received information with corresponding information stored in the information registration device 31. Whether or not the information agrees is determined in step S2. If the information agrees, the information processor 32 sends an agree signal to the door controller 52. As a result, the door controller 52 opens the first electronic lock 53 and the first door opens in step S3. When the information does not agree, error processes are performed in step S4. The door electronic lock 53** does not unlock during error processes, thereby preventing unauthorized people from entering the walk-in vault.

After entering the anteroom, the customer approaches the reception device 60 and inserts the electronic key 10 into the electronic key reader/writer 20d in step S5. At this point, the video camera 61 takes an image of the key number engraved or printed on the electronic key 10 which is recorded in the video tape recorder 62 with the use date and time, the safety-deposit box number and other data as one composite image in step S6. The composite image becomes evidence revealing when the safety-deposit box was used. The electronic key reader/writer 20*d* reads the management information recorded on the electronic key 10 inserted therein, and sends the read management information to the information processor 32 which collates it with management information registered in the information registration device 31 in step 7. When the two sets of management information do not agree when collated, error processes are performed in step S9. If they do agree, the display 63 requests the customer to enter his/her code number in step S8. The inputted code number is sent to the information processor 32 of the system controller 30 where it is compared with the number previously registered in the information memory in step S10. When the two numbers do not agree, error processes are performed in step S11. If the numbers agree, the information processor 32 of the system controller 30 commands the safety-deposit box controller 702 to open the bank-side lock 81 of the corresponding safety-deposit box in step S12. The safety-deposit box controller 70 unlocks the bank-side lock 81 and the display 63shows the customer that reception procedures are complete in step S13.

After completing reception procedures, the customer proceeds into the safety-deposit box chamber in step 14. As shown in FIG. 5B, the customer then inserts the electronic key 10 into the keyhole of the user-side lock 86 of his/her safety-deposit box in step S15. If the metal key portion 17 inserted into the keyhole by the customer is correct, the user-side lock 86 opens whereupon output from the dead bolt sensor 84 switches from closed to open. Because the bankside lock 81 is open at this point, the customer can then open the safety-deposit box door whereupon output from the door sensor 83 also switches from closed to open. The customer then removes the inner box whereupon output from the inner box sensor 82 switches from present to absent, which signifies start of using the safety-deposit box, in step S16.

After the customer finishes his business, the customer returns the inner box to the inner box receptacle, whereupon output from the inner box sensor 82 switches from absent to present, and closes the safety-deposit box door, whereupon output from the door sensor 83 switches from open to closed. The user-side lock 86 locks in step S17 whereupon output from the dead bolt sensor 84 switches from open to closed. The sensor status determination unit 72 detects these signal changes and sends signals accordingly to the electronic lock controller 71. The electronic lock controller 71 in turn sends a signal to the information processor 32 saying that the customer has completed using the safety-deposit box in step 18. The information processor 32 sends a lock signal to the electronic lock controller 71 to lock the bank-side lock 81 in step S19 whereupon the electronic controller 71 locks the bank-side lock automatically in step S20.

Figure 5C:
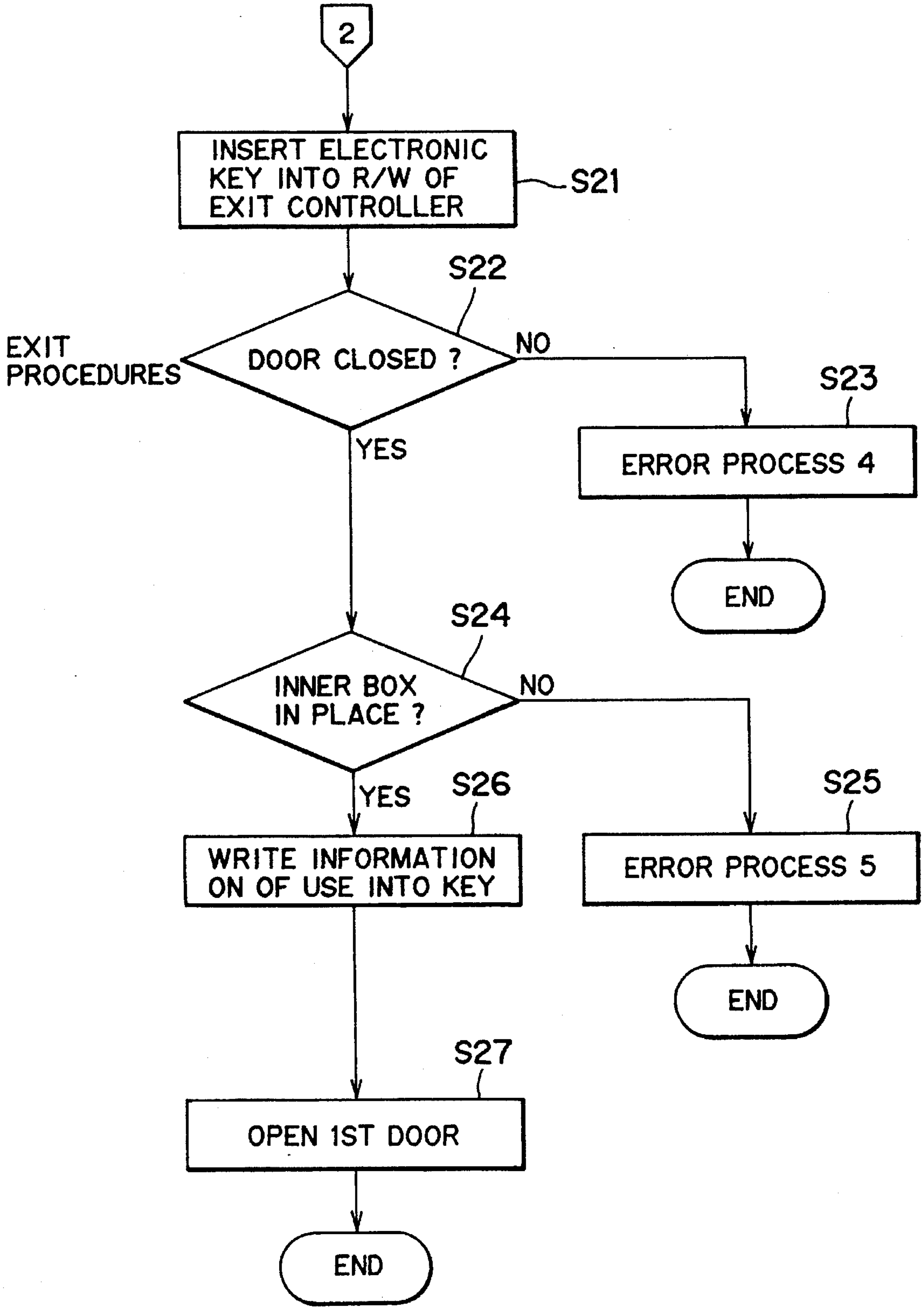
FIG. 5C is a flowchart showing exit operations of the safety-deposit box system.

As shown in FIG. 5C, the customer then leaves the safety-deposit box chamber, enters the anteroom and approaches the exit controller 50. The customer inserts the electronic key 10 into the electronic key reader/writer 20*c* 10 in step S21. The electronic key reader/writer 20c reads the management information recorded on the electronic key 10 and sends it to the information processor 32. The information processor 32 accesses the sensor status determination unit 72 and determines whether the door to the customer's safety-deposit box is locked or not based on output from the door sensor 83 in step S22. If the safety-deposit box door is not locked, error processes are performed and the display 51 draws this to the customer's attention with a warning in step S23. If the customer's safety-deposit box door is locked, the information processor 32 again accesses the sensor status determination unit 72 and determines whether the inner box is in place or not based on output by the inner box sensor 82 in step 24. If the inner box is not in place, error processes are performed in step S25 and the display 51 draws this to the customer's attention. When the inner box is in place, the electronic key reader/writer 20*c* writes the duration, time, and date of use time in step S26, causes the door controller 52 to open the door electronic lock 53 so the customer can open the first door and leave the walk-in vault in step S27. While this is happening, the information processor 32 writes a record of use in the information registration device 33. Every time error processes are performed, this information is recorded in the information memory 33. When the customer makes an error at the exit controller, the first door will not open so the customer can not leave the walk-in vault.

Figure 6:
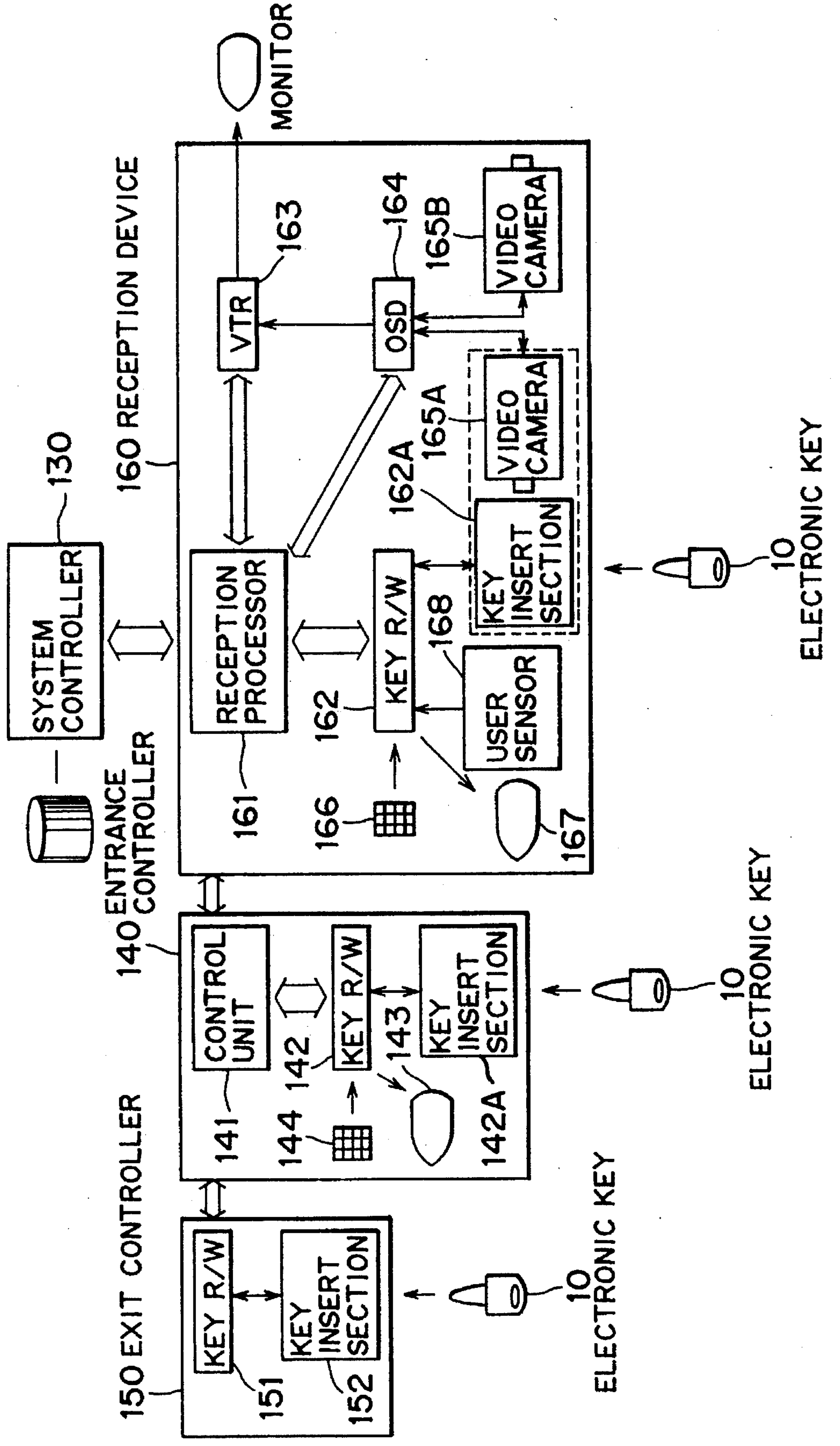
FIG. 6 is a block diagram showing the arrangement of a safety-deposit box system according to a second preferred embodiment of the present invention.
Figure 7A:
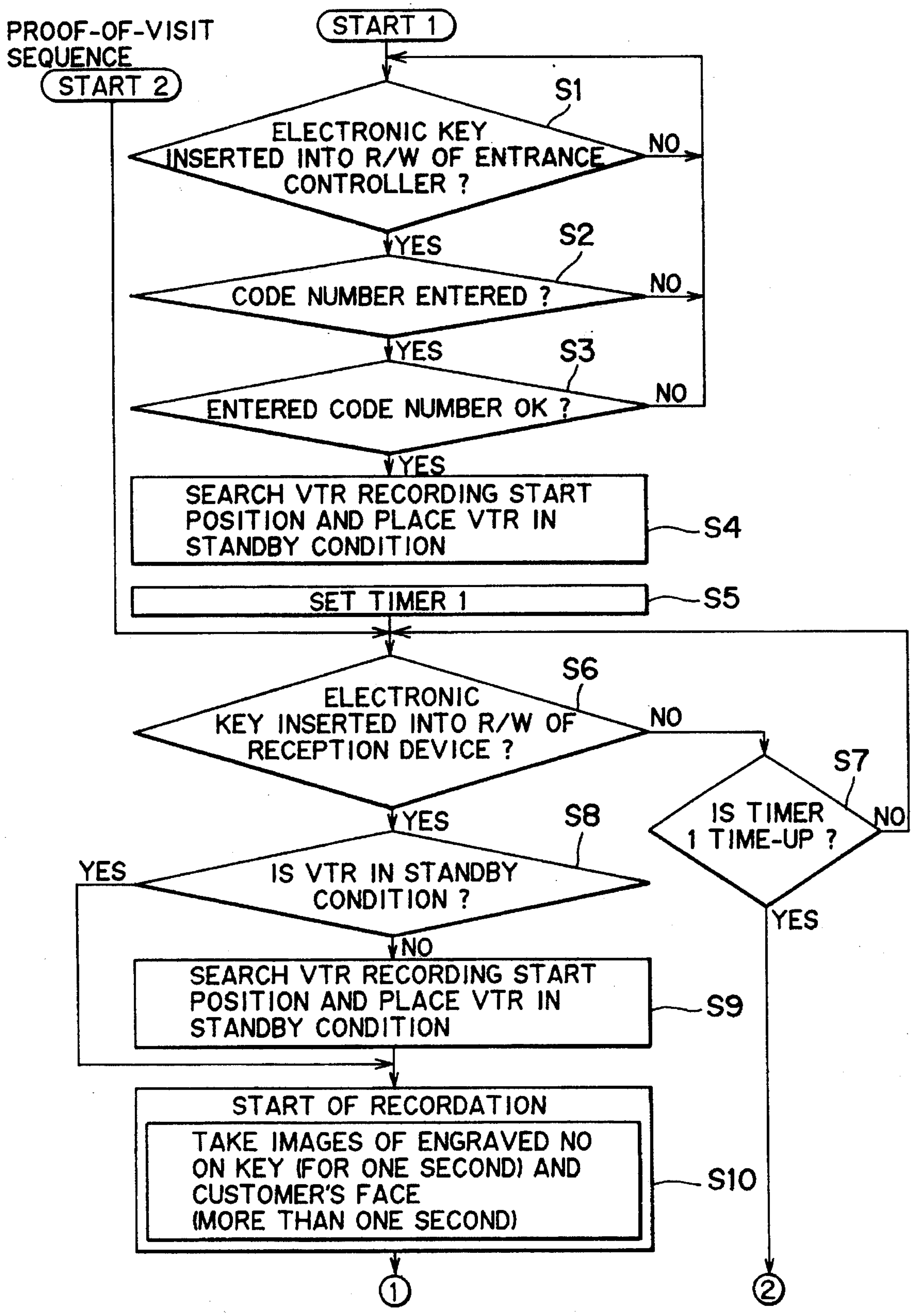
FIGS. 7A and 7B are flowcharts showing a proof-of-visit sequence in the second embodiment.
Figure 7B:
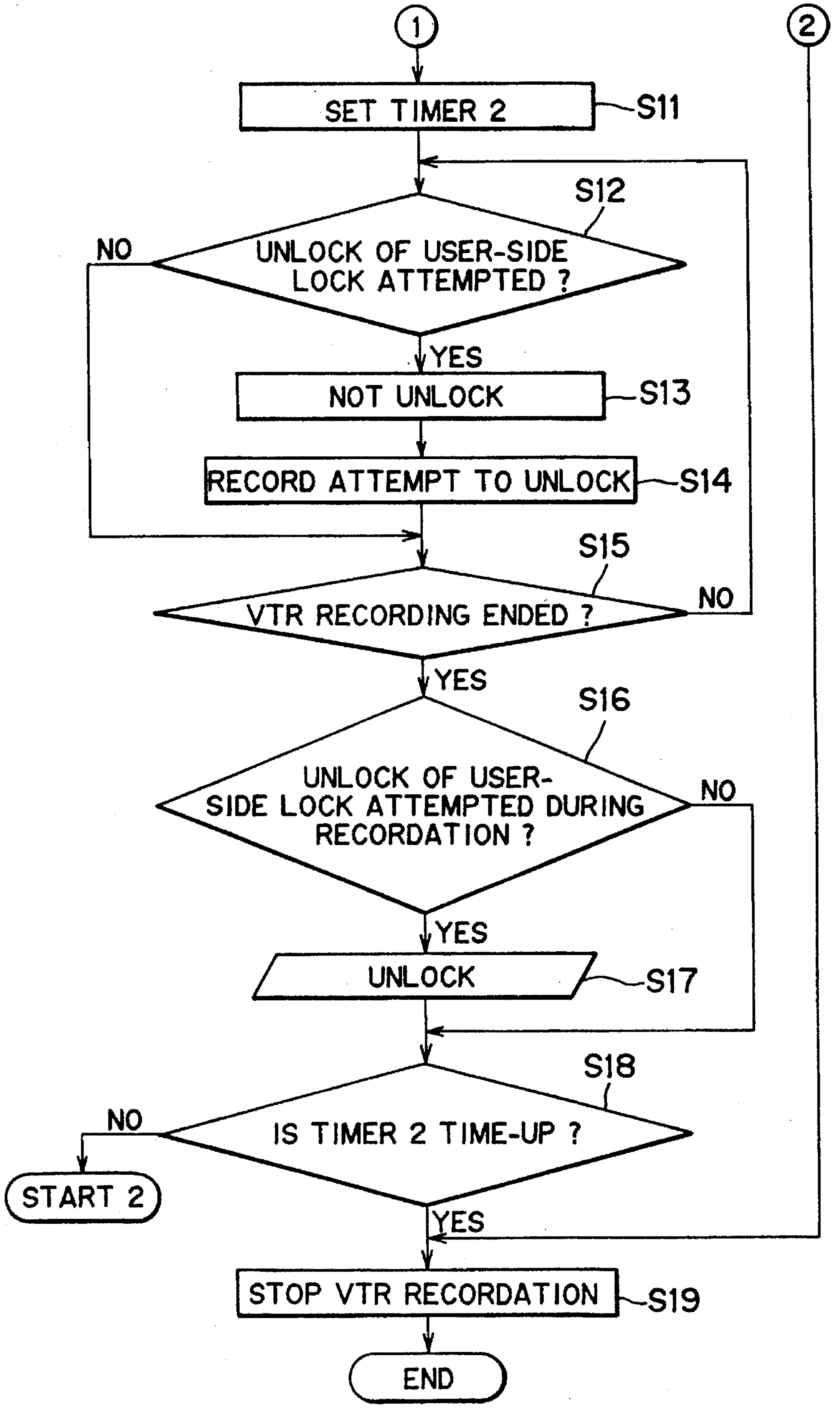

Next, a safety-deposit box system according to a second embodiment of the present invention will be described while referring to FIGS. 6, 7A, and 7B. As shown in FIG. 6, components of the second preferred embodiment are substantially similar to those of the first preferred embodiment except for the reception device 160 of the second preferred embodiment.

The reception device 160 according to the second preferred embodiment includes a reception processor 161. The reception processor 161 controls an electronic key reader/writer 162, a video tape recorder (VTR) 163, an on-screen display (OSD) 164, a first video camera 165A for picking up images of code numbers engraved on electronic keys 10 inserted in a key insert section 162A, and a second video camera 165B for picking up at least facial images of users. The electronic key reader/writer 162 is electrically connected to a keyboard 166, a display 167, and a user sensor 168.

The video tape recorder 163 in the second preferred embodiment functions as a recording means and operates under the aegis of the reception processor 161 while transmitting therewith. In the second preferred embodiment transmissions are performed according to VISCA protocol well known in the art. The video tape recorder 163 records images taken by the first video camera 165A and the second video camera 165B on a frame basis according to commands from the reception processor 161. However, any protocol can be used by which the video tape recorder can be controlled as accurately as or more accurately than when using VISCA.

The reception processor 161 sends a synchronization signal to the first video camera 165A and the second video camera 165B and switches between the two video cameras while taking images in synchronization. At least the date and time of use are recorded in composite with images recorded from the two video cameras. The composite image is created by the on-screen display 164 based on the time and date information stored internally in the reception processor 161. The on-screen display 164 can also incorporate management information other than the time and date, such as customer identification number and safety-deposit box number, into the composite image. Moreover, the video tape recorder 163 has a linear time counter function so that by recording on a predetermined channel the tape's absolute position, searching is easily performed.

The first video camera 165A is located within key insert section 162A at a position where it can pick up an image of identification information, such as a key number engraved on the blade of an electronic key 10 inserted in the key insert section 162A. The second video camera 165B is position so that it can pickup an image of at least the face of users in the safety-deposit box chamber.

Operations of the safety-deposit box system according to the second preferred embodiment are substantially the same as for the first preferred embodiment except those regarding image recording in the video tape recorder for creating proof of a visit by a customer. The sequence of operations involved, hereinafter referred to as the proof-of-visit sequence, will be explained while referring to the flow chart in FIGS. 7A and 7B.

The proof-of-visit sequence begins when the customer inserts his/her electronic key 10 into a key insert section 142A of an electronic key reader/writer 142 of the entrance controller 140 in step 1. Management information recorded on the electronic key 10 is read therefrom and sent to a control unit 141. If the read management information agrees with that recorded in the system controller 130 the inserted electronic key 10 is confirmed to be a usable key. The system controller 130 then sends the code number corresponding to the inserted electronic key 10 to the control unit 141. A message appears at the display 143 requesting the customer to input his/her code number into the keyboard 144 in step 2. If the code number inputted by the customer agrees with the code number sent from the system controller 130 in step 3, the system controller 130 sends a command to the video tape recorder 163 to search for the position on the tape one second before the end of the previously recorded section. The video tape recorder 163 searches for the position and goes into a standby condition there in step 4. A first timer internally provided to the reception processor 161 is set in step 5.

When procedures are completed at the entrance controller 140, the customer removes his/her electronic key 10 from the key insert section 142A, proceeds to the reception device 160, and inserts his/her electronic key 10 into the key insert section 162A in step 6. If the customer does not insert his/her electronic key 10 thereinto within a predetermined duration of time as determined by the first timer in step 7, an image will not be recorded in the video tape recorder 163 or opening of the safety-deposit box will be prohibited in step 19.

If the electronic key 10 is inserted into the key insert section 162A of the electric key reader/writer 162 before the predetermined duration of time runs out in step 6, proof-of-visit processes are performed. When the customer is near where the electronic key 10 is inserted, the user sensor 168 goes on, indicating that the customer is in a position where the second video camera 165B can pick up an image of the customer. Whether the video tape recorder 163 is in the standby condition or not is checked in step 8. If not, in step 6 the system controller 130 sends a command to the video tape recorder 163 to search for the position on the tape one second before the end of the previously recorded section. The video tape recorder 163 searches for the position and goes into a standby condition there in the same manner as in step 4. Recording starts at the position one second into the previously recorded section away from the end of the previously recorded section of tape. The video tape recorder 162 is operated by VISCA protocol to perform the connecting of the recording at a frame unit. A video tape recorder 163 is used that writes onto magnetic tape linear tape count information.

The first video camera 165A takes images from the start position at one second intervals of identification number engraved on inserted electronic keys. Next, the reception processor 161 switches from the first video camera 165A to the second video camera 165B for taking an image of the customer's face for more than one second in step 10. Because black and white video cameras come in more compact sizes and have a longer life, their use for the first video camera 165A and the second video camera 165B is preferable, The first video camera 165A and the second video camera 165B operate by external synchronization. The image does not distort when switching cameras because the cameras are synchronized at time of switching. A second timer provided to the reception processor 161 is started in step 11. If during recording the customer attempts to unlock the user-side lock as determined instep 12, the lock will not unlock in step 13 although that an attempt was made is recorded in step 14.

When recording by the video tape recorder 163 is confirmed completed in step 15, whether an attempt to open the user side lock was made or not is checked in step 16. If yes, the user-side lock is unlocked in step 17. If the time has not run out on the second timer, that is, if time between start of recorded and the time the user-side lock was opened is too short, steps6 through 17 are repeated. If the time has run out on the second timer, recording performed on the video tape recorder 163 is considered sufficient, and recording stops in step 19. Operational sequences in the exit controller 150 are the same as those described with reference to the first embodiment, thus the description thereof is omitted herein.

While in the foregoing embodiments, video cameras and video tape recorders are used to pick up and record an image of identification information, such as a key number engraved on the blade of the electronic key, and also an image of the face of users, these images may be recorded with the use of an optical photographic camera.

Figure 8:
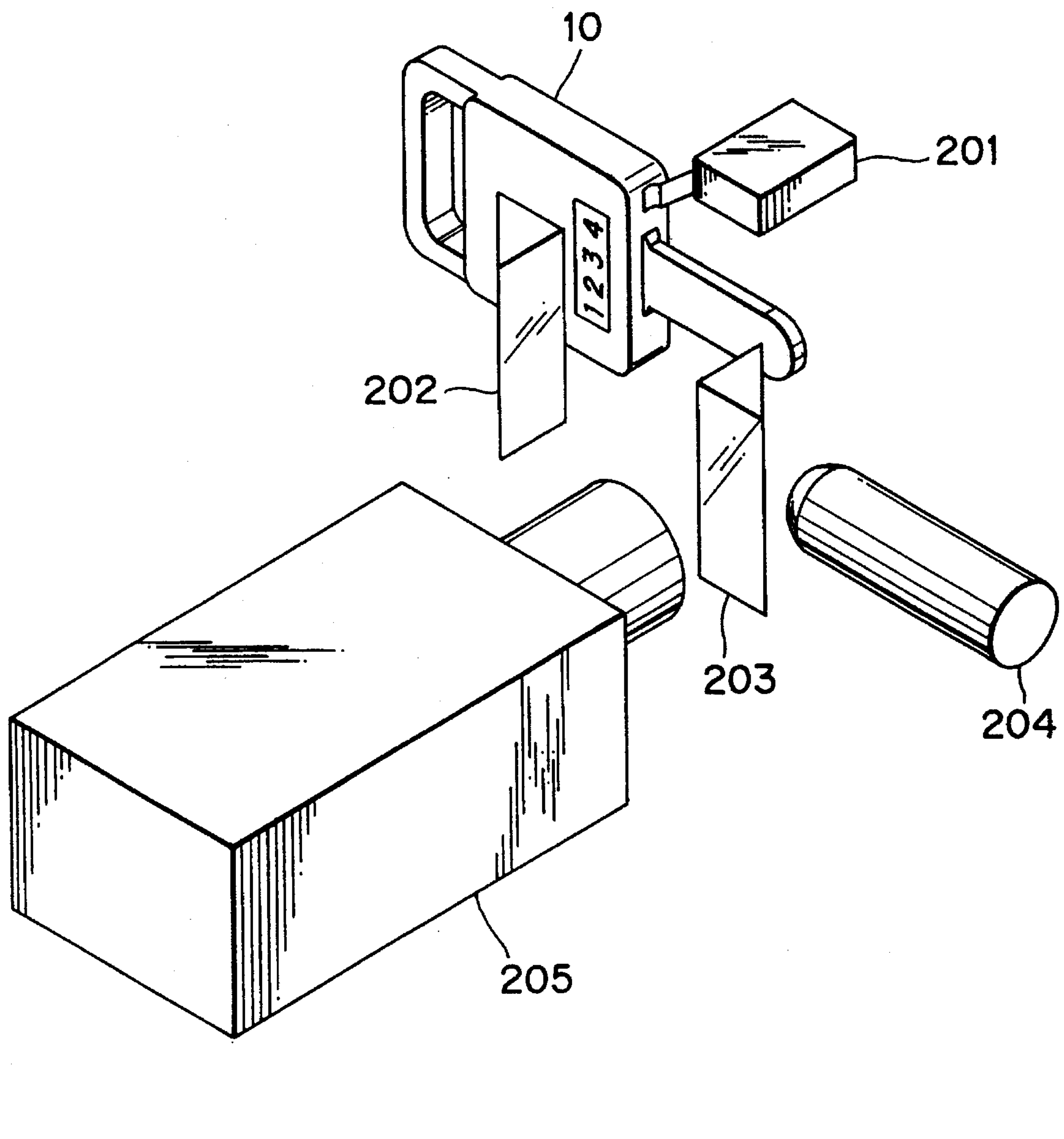
FIG. 8 is a perspective view showing another example of a proof-of-visit recording device.
Figure 9:
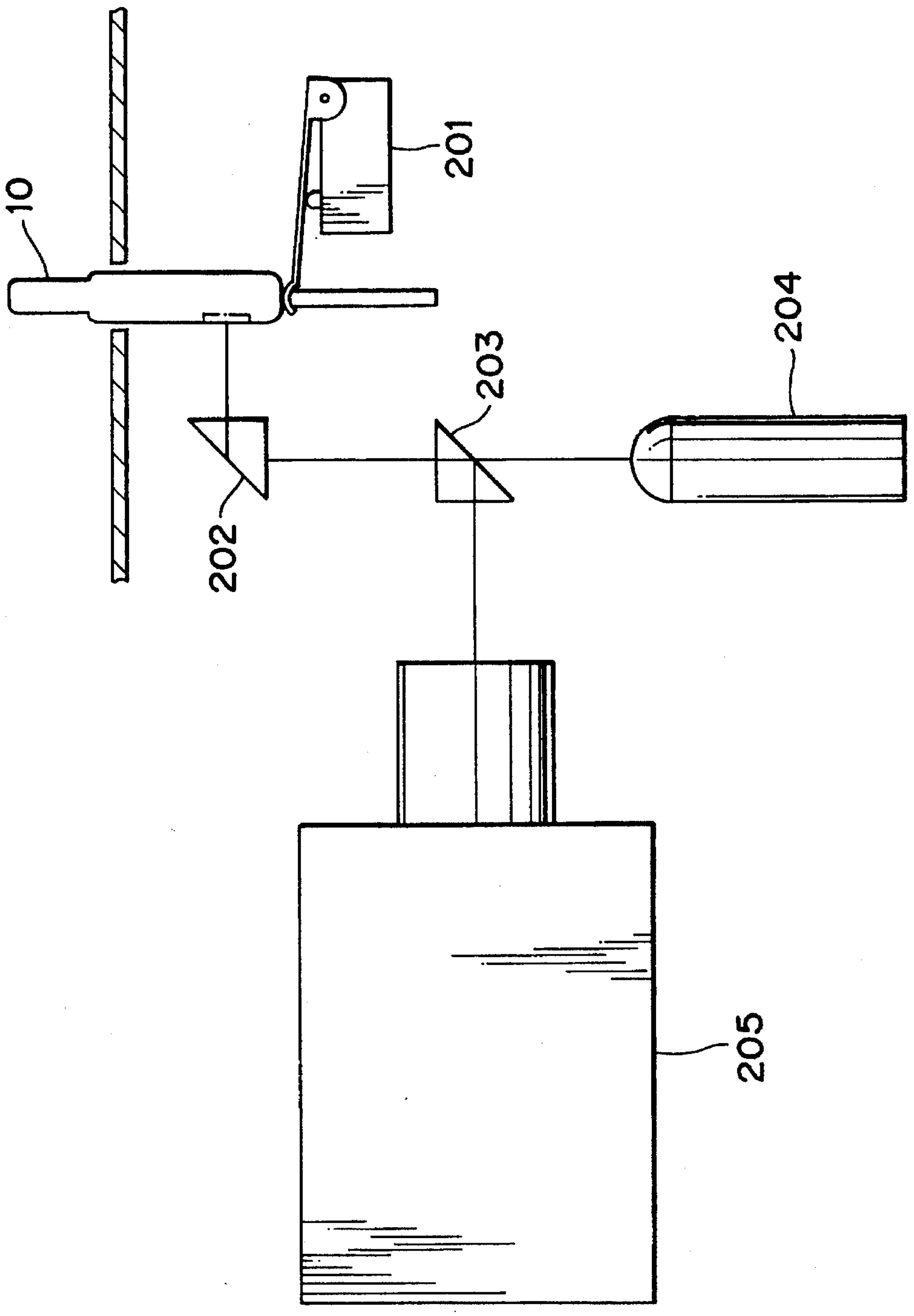
FIG. 9 is a plan view showing the device in FIG. 8.
Figure 10:
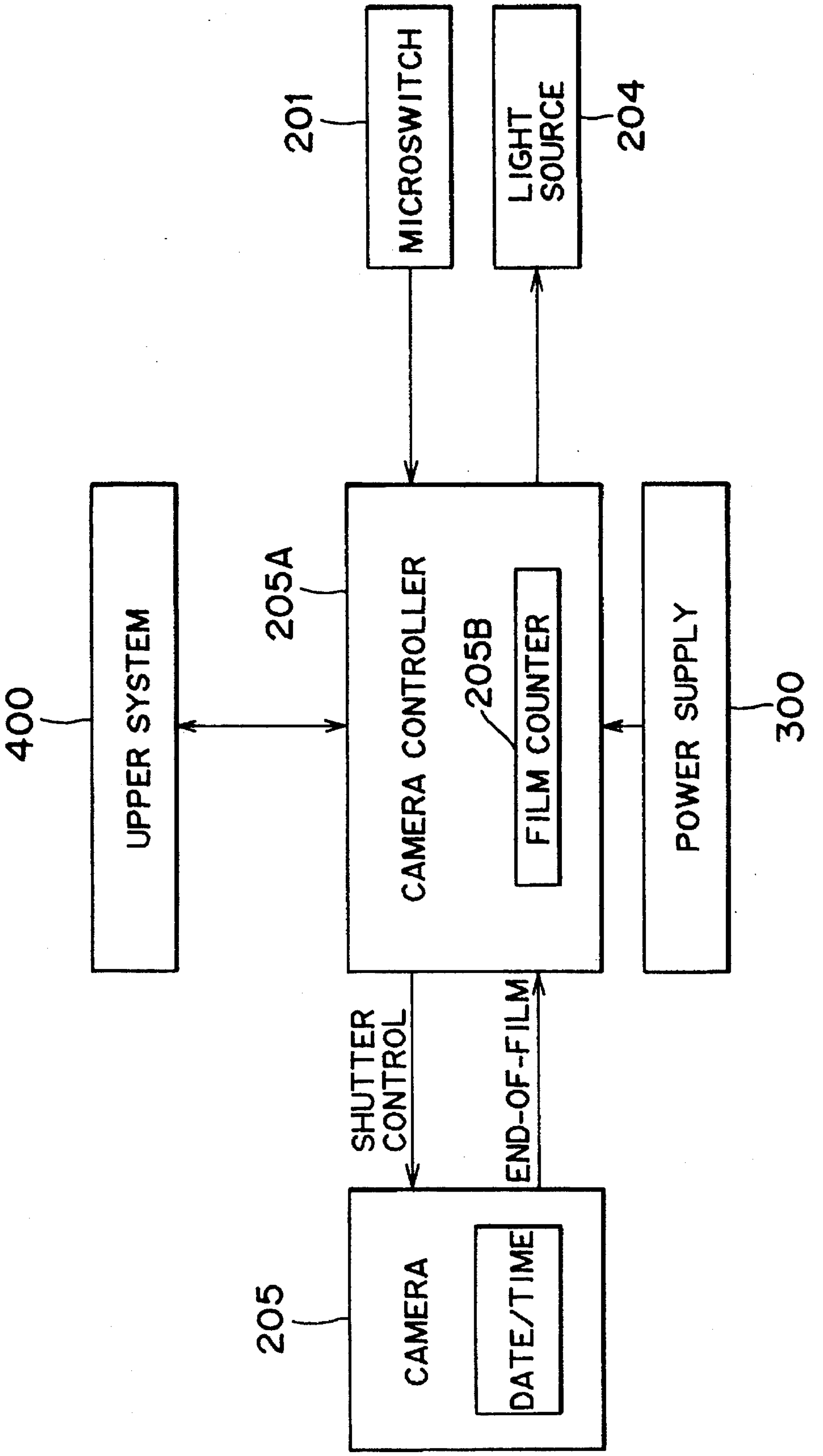
FIG. 10 is a block diagram showing the arrangement of the device shown in FIG. 8.

FIGS. 8 through 10 show an arrangement of an image pickup device for use in conjunction with the first and second embodiments described above. As shown in the figures, the image pickup device includes a microswitch 201, and an automatic photographic camera 205 which uses 8 mm film. First and second prisms 202 and 203 are arranged in predetermined positions so that an image of key number engraved or printed on the electronic key 10 is optically led to the camera 205. To provide a sufficient amount of light when photographing the key number by the camera 205, an illuminating light source 204 is disposed to illuminate light on the surface of the electronic key 10 where the key number is attached.

The microswitch 201 is actuated when the electronic key 10 is fully inserted into the key insert section. In this condition, the surface on which the key number is attached is in confrontation with a facet of the first prism 202. The light bearing the image of the key number is oriented by 90 degrees by the first prism 202 to lead it to the second prism 203 which in turn orients the light by 90 degrees so that the camera can pick up and photograph the image. The second prism 204 is a half-mirror, allowing light from the illuminating light source 204 to pass therethrough. The light passed through the second prism 203 is oriented by 90 degrees by the first prism 202 to illuminate the key number.

As shown in FIG. 10, the camera 205 is supplied with power from a power source 300 and is governed by a camera controller 205A. Specifically, the shutter of the camera 205 actuates in response to a signal fed from the camera controller 205A. To the camera controller 205A, connected are the microswitch 201, light source 204 and an upper system 400 such as a personal computer.

In operation, when the electronic key 10 is fully inserted, the microswitch 201 is actuated. In response to the actuation of the microswitch 201, the camera controller 205 supplied with power from the power supply 300 energizes the light source 204. Light from the light source 204 is illuminated on the key number engraved portion of the electronic key 10 through the prisms 203 and 202. The image of the key number enters the lens of the camera 205 through the prisms 202 and 203 with sufficient amount of light to enable the camera to photograph. The camera controller 205A then actuates the shutter of the camera 205 to photograph the image. Since the camera 205 has a date and time superimposing function, the date and time when the picture is taken appear in the picture. After photographing, the camera 205 automatically feeds the film by one frame to bring an unexposed film portion in confrontation with the lens of the camera. At the same time, the camera controller 205A increments a film counter205B provided internally thereof and notifies the upper system 400 of the end of photographing and also the count number in the film counter 205B. When the count number has reached a predetermined value, the upper system 400 determines the end of the film and prompts the replacement of the film. When the upper system 400 is notified the end of the film before the count number indicates the end of the film, the upper system 400 also determines the end of the film.

While the invention has been described in detail with reference to specific embodiments thereof, it would be apparent to those skilled in the art that various changes and modifications may be made therein without departing from the spirit of the invention.

For example, the present invention was explained as a safety-deposit box system for proving visits by customers to a bank. However, the system is also applicable for proving visits of customers to automatic tellers and night depositories of banks by recording an image of the embossing on electric cards and the like used therein. The system can also be used to record images of other forms of identification such as company I.D.s or driver's licenses. Also recordings were described as made using a video tape recorder. However, a magnetooptical disk, worm type or rewriteable type optical disk, digital audio tape, or hard disk could also be used. Data can be recorded in these media in analog or digital form.

What is claimed is:

1. A safety-deposit box system comprising:

multi-function key including a first electronic memory portion and a metal key portion, the first electronic memory portion having recorded therein a first set of safety-deposit box user information and having a control memory which includes a microcomputer, wherein signals representing the first set of safety-deposit box user information are transmitted under the control of said control memory;

a safety-deposit box including a door with a user-side lock;

a reception device including a reading means for reading the signals representing the first set of safety-deposit box user information;

a system controller including a second electronic memory and a determination means, the second electronic memory containing a second set of safety-deposit box user information which said determination means compares with the first set of safety-deposit box user information, said system controller outputting a permission-to-use signal when the first set of safety-deposit box user information agrees with the second set of safety-deposit box user information; and a safety-deposit box controller including a mechanical appropriateness determination means for determining mechanical appropriateness of the metal key portion, the safety-deposit box controller receiving the permission-to-use signal and opening the user-side lock if said mechanical appropriateness determination means determines that the metal key portion is mechanically appropriate.

2. The system according to claim 1, wherein said multi-function key has a surface to which an identification code is provided for identifying an authorized user, and further comprising an image pickup/recording means for picking up and recording an image of the identification code.

3. The system according to claim 2, wherein said image pickup/recording means further picks up and records a face of a user who uses said multi-function key.

4. The system according to claim 3, wherein said image pickup/recording means comprises a first video camera for picking up the image of the identification code, a second video camera for picking up the face of the user who uses said multi-function key, and a video tape recorder for recording the images picked up by said first and second video cameras.

5. The system according to claim 4, wherein said first video camera and said second video camera are operated in synchronization with each other.

6. The system according to claim 2, wherein said image pickup/recording means comprises a video camera and video tape recorder.

7. The system according to claim 2, wherein said image pickup/recording means comprises a photographic camera.

8. The system according to claim 2, wherein said system controller writes in said second electronic memory information about a use of said safety-deposit box, said writing occuring when the user-side lock is locked after being opened, and further comprising an exit device including a writing means for writing the information about the use of said safety-deposit box in the first electronic memory portion.

9. The system according to claim 8, wherein said writing means optically writes the information in the first electronic memory portions.

10. A safety-deposit box system as claimed in claim 9, wherein the first electronic memory portion of said multi-function key further comprises a first light receiving unit for receiving said information about the use of said safety-deposit box from said writing means and for sending said information to said control memory.

11. The system according to claim 1, wherein said multi-function key has a surface to which an identification code is provided for identifying an authorized user, and wherein said reception device further includes an image pickup/recording means for picking up and recording an image of the identification code and a control means for controlling said image pickup/recording means.

12. The system according to claim 11, wherein said image pickup/recording means further picks up and records a face of a user who uses said multi-function key.

13. The system according to claim 12, wherein said image pickup/recording means comprises a first video camera for picking up the image of the identification code, a second video camera for picking up the face of the user who uses said multi-function key, and a video tape recorder for recording the images picked up by said first and second video cameras.

14. The system according to claim 13, wherein said control means controls said first video camera and said second video camera to operate in synchronization with each other.

15. The system according to claim 11, wherein said image pickup/recording means comprises a video camera and video tape recorder.

16. The system according to claim 11, wherein said image pickup/recording means comprises a photographic camera.

17. The system according to claim 11, wherein said system controller writes in said second electronic memory information about a use of said safety-deposit box, said writing occurring when the user-side lock is locked after being opened, and further comprising an exit device including a writing means for writing the information about the use of said safety-deposit box in the first electronic memory portion.

18. The system according to claim 17, wherein said writing means optically write the information in the first electronic memory portion.

19. The system according to claim 1, wherein the first electronic memory portion and the metal key portion of said multi-function key are integral with each other.

20. The system according to claim 1, wherein the first electronic memory portion and the metal key portion are separable one from the other.

21. The system according to claim 1, wherein said reading means optically reads the first set of safety-deposit box user information.

22. A safety-deposit box system as claimed in claim 1, wherein the first electronic memory portion of said multi-function key further comprises a first light emitting unit for transmitting said signals representing the first set of safety-deposit box user information.

23. A safety-deposit box system as claimed in claim 1, wherein said control memory comprises electrical circuitry for storing information and electrical circuitry for controlling the storage and retrieval of said information.

24. A safety-deposit box system as claimed in claim 23, wherein said electrical circuitry for storing information comprises an EEPROM.

* * * * *